United States Patent
Lee

(10) Patent No.: US 8,188,713 B2
(45) Date of Patent: May 29, 2012

(54) FIXED CHARGING SOCKET FOR DIGITAL DEVICES

(76) Inventor: Shuen-Ching Lee, Taipei County (TW)

( * ) Notice: Subject to any disclaimer, the term of this patent is extended or adjusted under 35 U.S.C. 154(b) by 361 days.

(21) Appl. No.: 12/641,636

(22) Filed: Dec. 18, 2009

(65) Prior Publication Data

US 2011/0148358 A1 Jun. 23, 2011

(51) Int. Cl.
*H01M 10/46* (2006.01)

(52) U.S. Cl. ........................................ 320/111

(58) Field of Classification Search .................. 320/107, 320/111, 112, 114
See application file for complete search history.

(56) References Cited

U.S. PATENT DOCUMENTS

| | | | |
|---|---|---|---|
| 2005/0248312 A1* | 11/2005 | Cao et al. | 320/114 |
| 2006/0125445 A1* | 6/2006 | Cao et al. | 320/112 |
| 2006/0267549 A1* | 11/2006 | Kung | 320/111 |
| 2008/0284371 A1* | 11/2008 | Hsu | 320/111 |
| 2009/0309542 A1* | 12/2009 | Hung et al. | 320/111 |

* cited by examiner

*Primary Examiner* — Edward Tso
(74) *Attorney, Agent, or Firm* — Bacon & Thomas, PLLC

(57) ABSTRACT

An embedded charging socket includes a case and an AC-to-DC circuit. The case is combined with a positioning slot of a panel, so as to be fixed on a specific position, for example, a wall surface, through the panel. The case has an AC input end disposed on one side for inputting an AC voltage, and has at least one universal serial bus (USB) slot disposed on the other side. Further, the AC-to-DC circuit is disposed inside the case, and has two sides respectively electrically connected to the AC input end and the USB slot, for converting the AC voltage to a DC voltage, then outputting the DC voltage through the USB slot, and charging an electric apparatus after an USB connector is inserted.

9 Claims, 4 Drawing Sheets

FIXED CHARGING SOCKET FOR DIGITAL DEVICES

FIELD OF THE INVENTION

The present invention relates to a charging socket, and more particularly to an embedded charging socket, connected to an AC source and disposed in a fixed position, for providing universal serial bus (USB) charging for different electric apparatus.

BACKGROUND

Under the trend of digitalization, electric apparatus, such as personal digital assistants (PDAs), mobile phones, digital video cameras and recorders, walkmans, and illuminating lamps, become quite popular. An interface standard, a USB, is used to simultaneously provide data transmission and charging functions. Therefore, when selling the electric apparatus, the manufacturer provides a charger in the standard accessories for charging the cell of the electric apparatus.

For a common manner of charging the electric apparatus, usually a plug of the external charger needs to be connected to an AC source, and after a rectification process and a bucking process of circuits in the charger, the charger is then inserted to the electric apparatus through a wire and a plug to charge the cell. However, when a user purchases a new electric apparatus, or owns different types of electric apparatus at the same time, the following problems may occur due to the large number of required chargers.

1. When the user owns different types of chargers at the same time, storage space for the chargers is increased, and the chargers are easily mixed up.

2. When a charger is damaged or lost and may not be replaced, the user needs to purchase a new one, thereby increasing the acquisition cost of the electrical apparatus.

3. Although the user may directly charge the electric apparatus by using the charger, since no fixed charging position exists indoor, during a charging process, not only is a charger required, but also a charging socket needs to be found, which is inconvenient in use.

4. After using the charger, if the user only pulls out the electric apparatus but leaves the charger plugged in the socket, the power is continuously consumed, resulting in waste of electricity.

Accordingly, in order to solve the above problems and provide a charging socket having advantages of being conveniently used, saving space, and reducing the acquisition cost, the inventor puts forward the present invention based on long-term experience and after continuous research and improvements.

SUMMARY OF THE INVENTION

The primary object of the present invention is to provide an embedded charging socket, wherein a case is fixedly connected to an AC voltage, and the AC voltage is converted by an AC-to-DC circuit for outputting a DC voltage and charging through a USB slot, so as to provide USB charging for different electric apparatus in a fixed position, thereby saving storage space and acquisition cost of conventional chargers.

A secondary object of the present invention is to provide an embedded charging socket, wherein a switch is disposed between an AC input end and a USB slot, so as to cut off an input power source while in a non-charging state, thereby saving energy.

In order to achieve the abovementioned objectives, the present invention provides an embedded charging socket, which includes a case and an AC-to-DC circuit. The case is combined with a positioning slot of a panel, and has an AC input end disposed on one side and at least one USB slot disposed on the other side. The AC-to-DC circuit is disposed within the case, and has two sides respectively electrically connected to the AC input end and the USB slot, for converting an AC voltage to a DC voltage after the AC voltage is inputted, and outputting the DC voltage for charging through the USB slot.

In practice, the embedded charging socket of the present invention further includes a switch, electrically connected between the AC input end and the AC-to-DC circuit, for allowing a user to manually switch the AC input end and the AC-to-DC circuit to be in an ON or OFF state.

In practice, the embedded charging socket of the present invention further includes a load sensor, electrically connected between the AC-to-DC circuit and the USB slot, and electrically connected to the switch, for detecting a load of the USB slot, so as to control the switching the AC input end and the AC-to-DC circuit between an ON or OFF state.

Other objects, advantages and novel features of the present invention will become more apparent from the following detailed description when taken in conjunction with the accompanying drawings.

DETAILED DESCRIPTION

Figure 1:
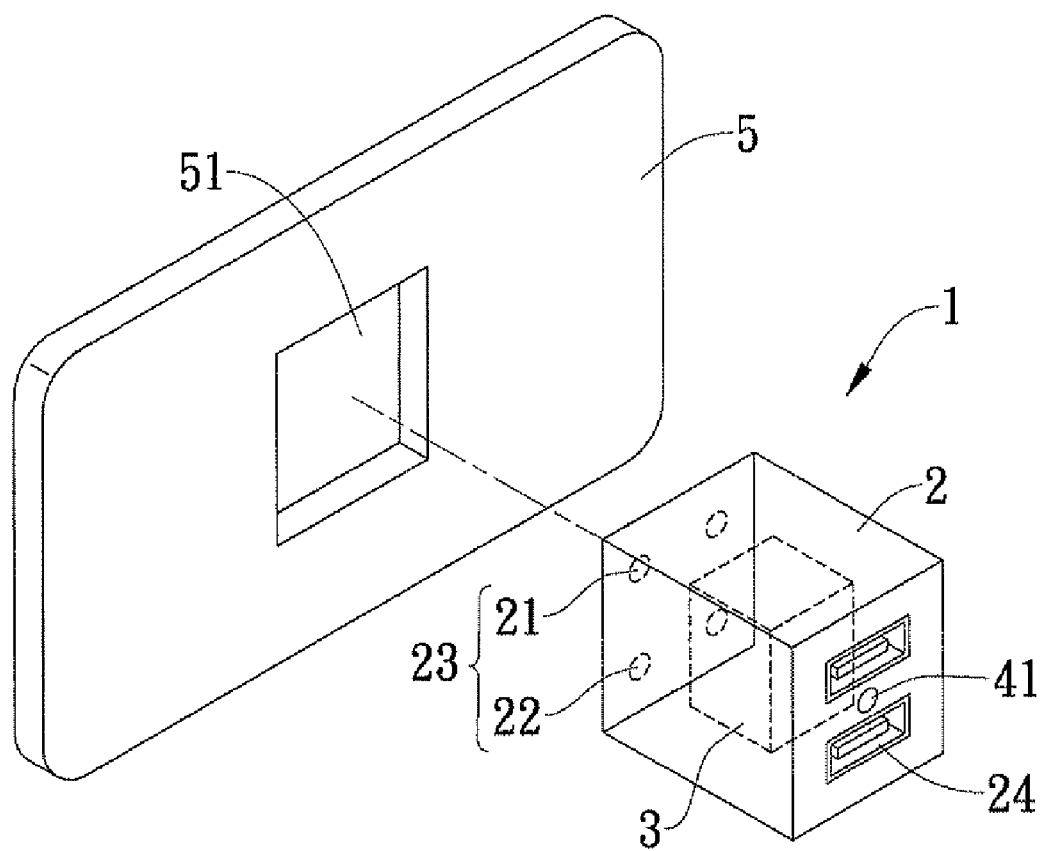
FIG. 1 is a perspective view of a first embodiment of the present invention in combination with a panel.
Figure 2:
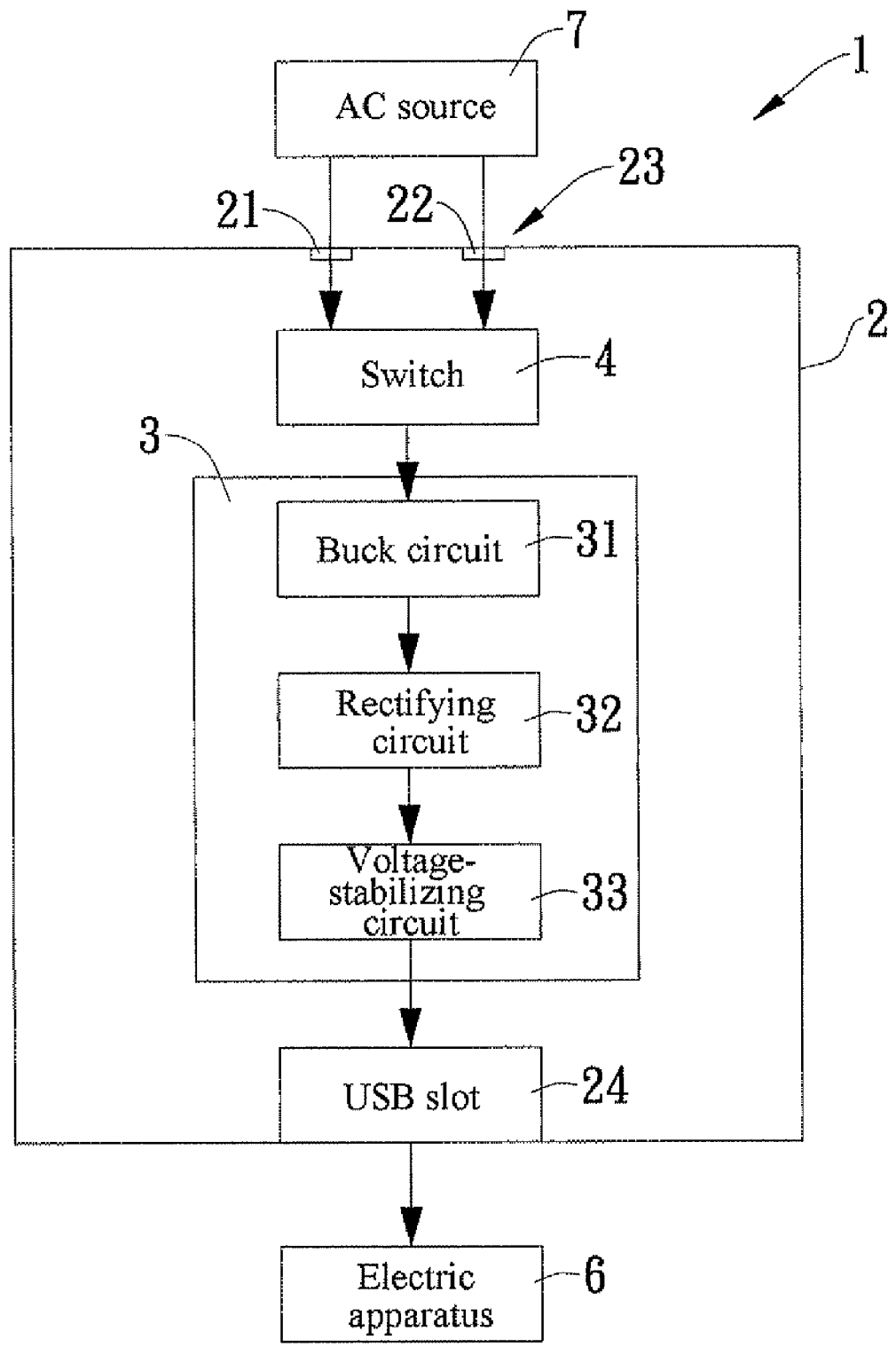
FIG. 2 is a circuit block diagram of the first embodiment of the present invention.

Referring to FIGS. 1 and 2, a first embodiment of an embedded charging socket 1 according to the present invention is shown. The embedded charging socket 1 includes a case 2 and an AC-to-DC circuit 3.

The case 2 is substantially a cuboid and correspondingly embedded in a rectangular positioning slot 51 of a panel 5. The panel 5 is combined with a wall, or is attached to a wooden wall surface, a cabinet board, a bed headboard, a desk board, or other boards. One side of the case 2 is defined to be a rear side for the visual line of a user, and has an upper jack and a lower jack (21 and 22) disposed thereon. The two jacks (21 and 22) form an AC input end 23, for inputting an AC voltage of 100 V, or inputting an AC voltage of 100 V to 240 V according to actual demands. The other side of the case 2 is defined to be a front side for the visual line of the user, and has two USB slots 24 or one USB slot 24 disposed thereon. The USB slot 24 allows an electric apparatus 6 having a USB connector, for example, a PDA, a mobile phone, a digital video camera and recorder, an MP3, or an MP4, to be plugged in, thereby providing a DC source output of 5 V.

The AC-to-DC circuit 3 and a switch 4 are connected inside the case 2, and two sides of the AC-to-DC circuit 3 are respectively electrically connected to the switch 4 and the USB slot 24, for converting an AC voltage to a DC voltage after the AC input end 23 inputs the AC voltage. Further, the AC-to-DC circuit 3 includes a buck circuit 31, a rectifying circuit 32, and a voltage-stabilizing circuit 33. The switch 4 is respectively electrically connected to the AC input end 23 and the buck circuit 31, and a control button 41 of the switch 4 is raised from the front side of the case 2, such that the user manually presses the control button 41 to switch the AC input end 23 and the buck circuit 31 of the AC-to-DC circuit 3 to be in an ON or OFF state. The rectifying circuit 32 and the voltage-stabilizing circuit 33 are electrically connected to a rear end of the buck circuit 31 in sequence, and the voltage-stabilizing circuit 33 is electrically connected to the USB slot 24, such that the AC voltage of 100 V to 240 V output from an AC source 7 is stepped down to a low voltage, the low voltage is rectified to a DC voltage of 5 V, then the DC voltage is stabilized by the voltage-stabilizing circuit 33, and the stabilized DC voltage is output from the USB slot 24.

Figure 3:
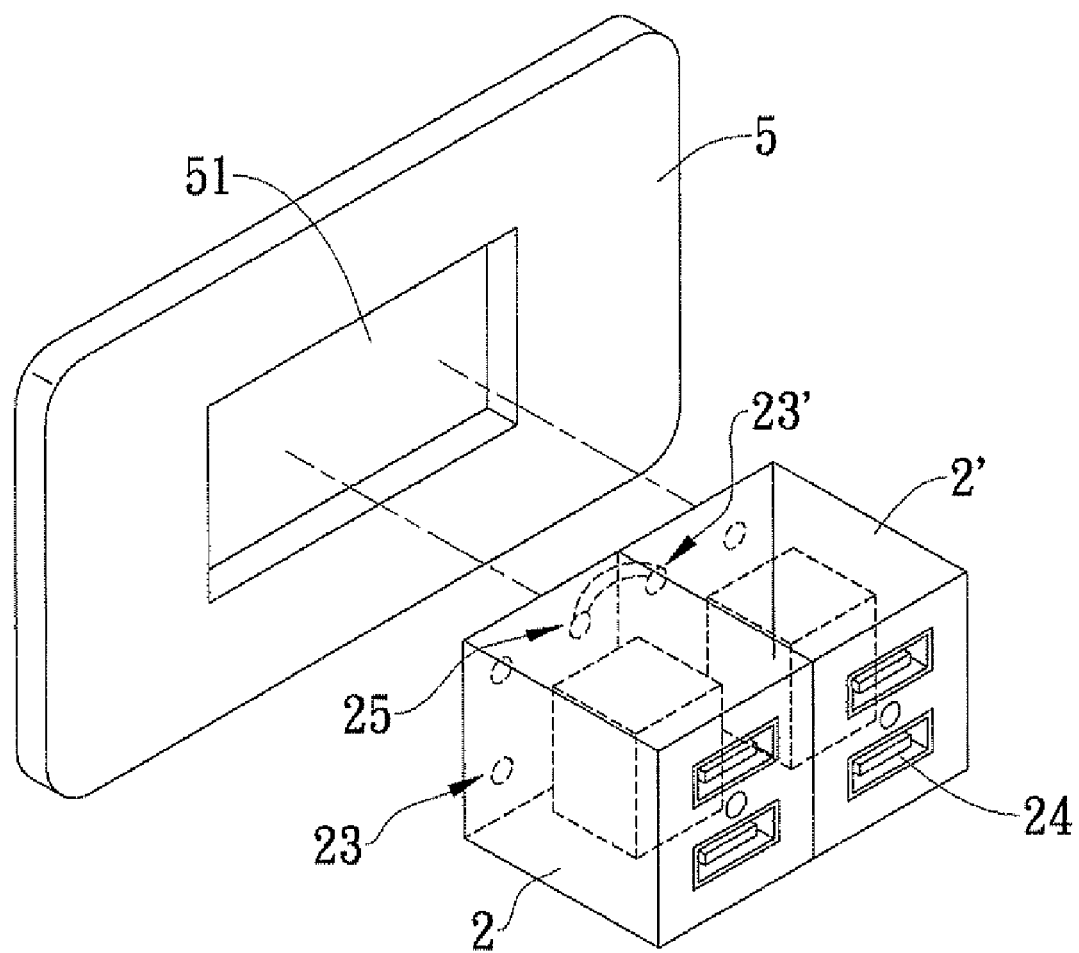
FIG. 3 is a perspective view of the first embodiment of the present invention with two cases.

Referring to FIG. 3, the AC input end 23 of the case 2 further has an AC output end 25 disposed on one side, such that the AC output end 25 of the case 2 is connected in parallel to an AC input end 23' of another case 2', and is positioned in the positioning slot 51 of the panel 5, so as to increase the number of USB slots 24.

Figure 4:
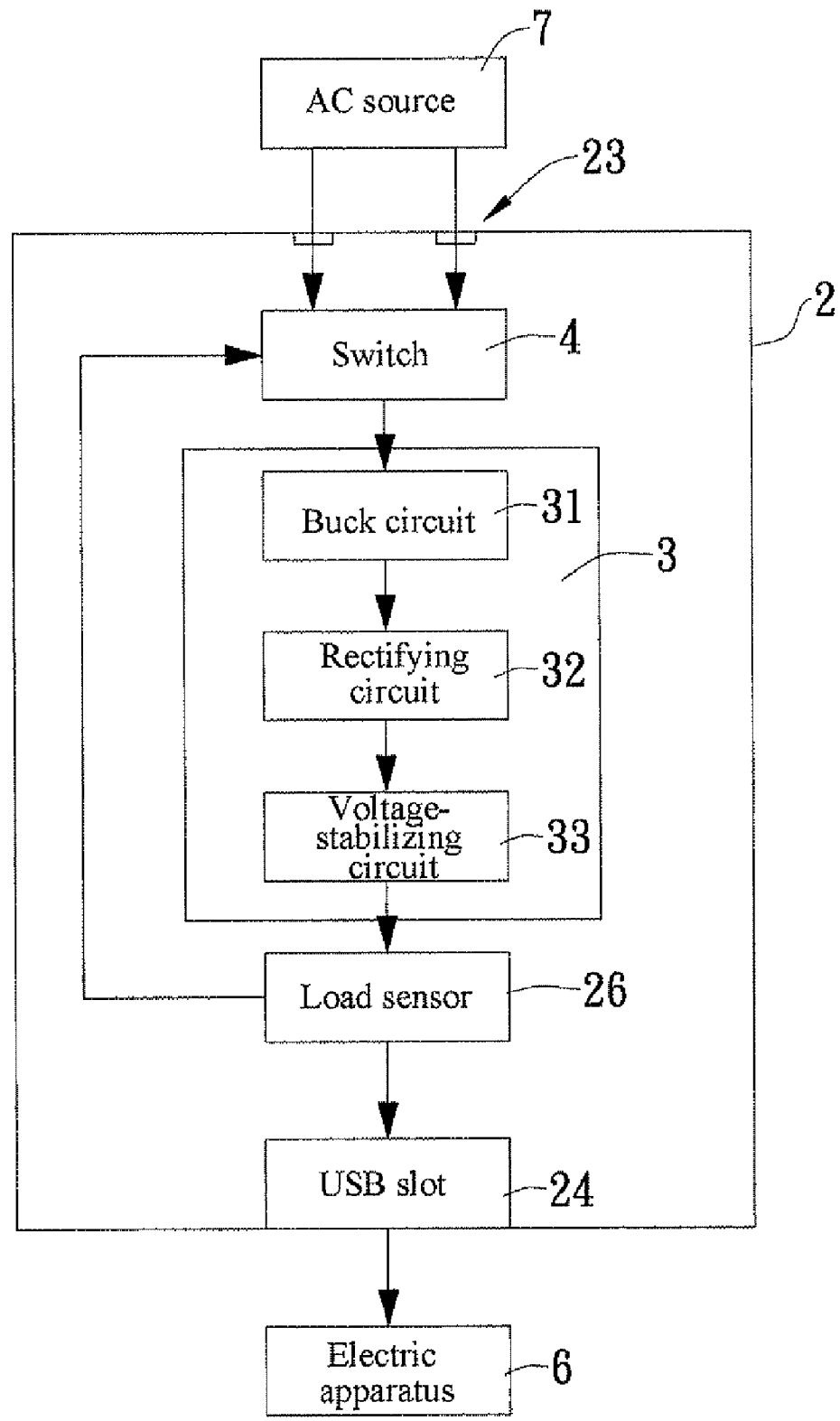
FIG. 4 is a circuit block diagram of a second embodiment of the present invention.

Referring to FIG. 4, a second embodiment of the embedded charging socket 1 according to the present invention is shown, which is different from the first embodiment in that the case 2 further has a load sensor 26 disposed therein. The load sensor 26 is electrically connected between the voltage-voltage-stabilizing circuit 33 of the AC-to-DC circuit 3 and the USB slot 24, and the load sensor 26 is electrically connected to the switch 4, so as to emit a signal to control the switch 4 to automatically switch the AC input end 23 and the AC-to-DC circuit 3 to be in the ON state, when detecting a load of the USB slot 24 after the USB connector of the electric apparatus 6 is inserted into the USB slot 24. When not detecting the load of the USB slot 24, the load sensor 26 automatically cuts off the switch 4, so as to interrupt the electrical connection between the AC source 7 and the AC-to-DC circuit 3.

Therefore, the present invention has the following advantages.

1. The present invention may be directly fixed on a wall, a wooden wall surface, a cabinet board, a bed headboard, a desk board, or other boards, so as to provide USB charging for different electric apparatus, which is quite convenient in use.

2. Since the present invention may provide USB charging for different electric apparatus, the manufacturers do not need to list chargers in the standard accessories, thereby reducing the cost and the waste of resources, and further saving the storage space and the acquisition cost of the chargers for the user.

3. In the present invention, the manual or automatic detecting switch is adapted to control the AC input end and the USB slot between an ON or OFF state. Therefore, when the electric apparatus is in a non-charging state, the input AC source is cut off, thereby ensuring use security and saving energy.

The present invention achieves the anticipated objectives, and provides an embedded charging socket, capable of being conveniently used, saving the space, and effectively reducing the acquisition cost and the waste of the resources, which is rather practical.

It should be understood that different modifications and variations could be made from the disclosures of the present invention by the people familiar in the art without departing the spirit of the present invention.

What is claimed is:

1. An embedded charging socket, comprising:
    a case, combined with a positioning slot of a panel, and having an AC input end disposed on one side and at least one universal serial bus (USB) slot disposed on the other side;
    an AC-to-DC circuit, disposed within the case, and having two sides respectively electrically connected to the AC input end and the USB slot, for converting an AC voltage to a DC voltage after the AC voltage is input, and outputting the DC voltage for charging through the USB slot; and
    a switch electrically connected between the AC input end and the AC-to-DC circuit.

2. The embedded charging socket according to claim 1, wherein the AC input end has two jacks.

3. The embedded charging socket according to claim 1, wherein the AC-to-DC circuit comprises a buck circuit, a rectifying circuit, and a voltage-stabilizing circuit electrically connected to one another.

4. The embedded charging socket according to claim 1, wherein the switch is a manual switch.

5. The embedded charging socket according to claim 1, further comprising: a load sensor, electrically connected between the AC-to-DC circuit and the USB slot, and electrically connected to the switch, for detecting a load of the USB slot, so as to control the switch to switch the AC input end and the AC-to-DC circuit to be in an ON or OFF state.

6. The embedded charging socket according to claim 2, wherein the AC-to-DC circuit comprises a buck circuit, a rectifying circuit, and a voltage-stabilizing circuit electrically connected to one another.

7. An embedded charging socket, comprising:
    a case, combined with a positioning slot of a panel, and having an AC input end disposed on one side and at least one universal serial bus (USB) slot disposed on the other side;
    an AC-to-DC circuit, disposed within the case, and having two sides respectively electrically connected to the AC input end and the USB slot, for converting an AC voltage to a DC voltage after the AC voltage is input, and outputting the DC voltage for charging through the USB slot; and
    wherein the AC input end has two jacks, and further including a switch electrically connected between the AC input end and the AC-to-DC circuit.

8. The embedded charging socket according to claim 7, wherein the switch is a manual switch.

9. The embedded charging socket according to claim 7, further comprising: a load sensor, electrically connected between the AC-to-DC circuit and the USB slot, and electrically connected to the switch, for detecting a load of the USB slot, so as to control the switch to switch the AC input end and the AC-to-DC circuit to be in an ON or OFF state.

* * * * *